Figure 1:
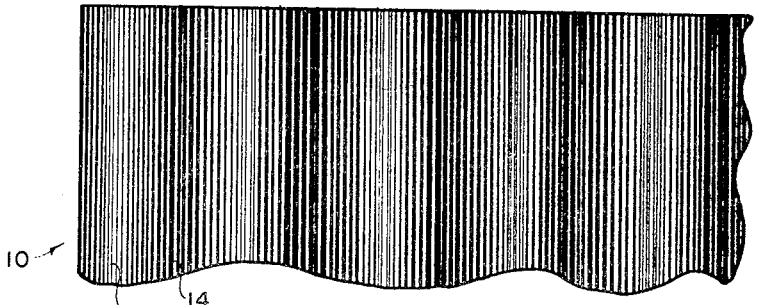
Figure 2:
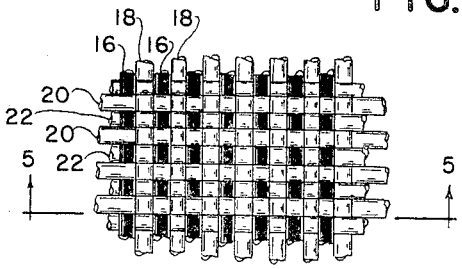
Figure 5:
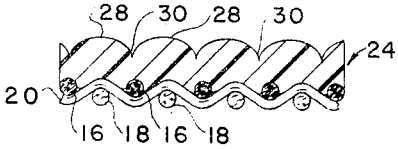
Figure 3:
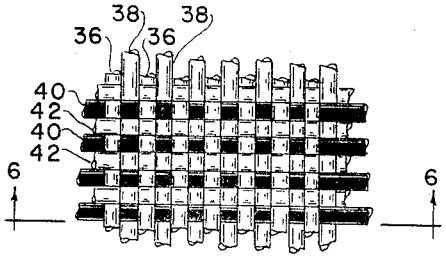
Figure 6:
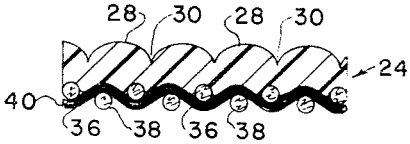
Figure 4:
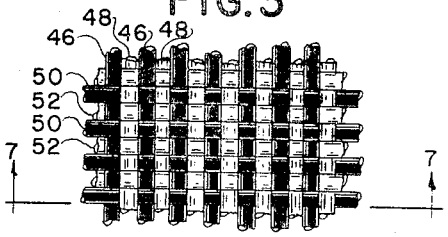
Figure 7:
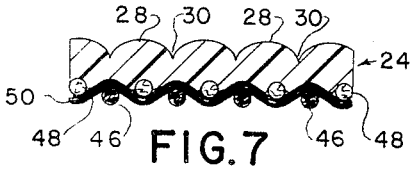
Figure 8:
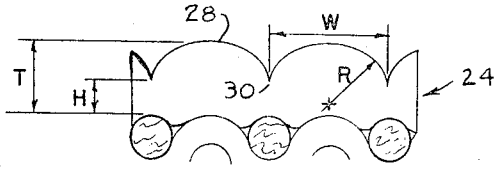

DEFENSIVE PUBLICATION

T867008

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 748

819,074

ORNAMENTAL FABRIC HAVING A TRANSPARENT LENTICULATED COATING AND METHOD OF MAKING

James E. Hauffaker, P.O. Box 511, Kingsport, Tenn. 37662

Filed Apr. 24, 1969. Published Oct. 21, 1969
Int. Cl. B44f *1/08;* D06q *1/00*
U.S. Cl. 161—2
1 Sheet Drawing. 12 Pages Specification

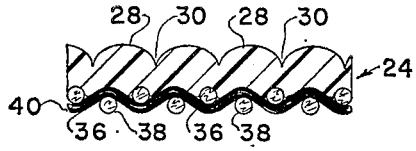

A novelty article of manufacture and method of making same in which a fabric is produced having alternating lines of different color by weaving a particular pattern or dyeing a fabric comprising strands having different dye receptivity. A moire effect is seen when the fabric is provided with a transparent lenticulated coating. The desired frequency of the alternating lines of different colors is first determined. The fabric is made having the desired line frequency, and subsequently coated with a transparent plastic material. The surface of the plastic is embossed to produce a plurality of adjacent elongated lenses extending parallel to or at a slight angle to the lines. The width of the lenses is selected so that there will be a predetermined number of lenses in relation to the number of pairs of lines (one of each color) for a given width. If the lenses are parallel to the lines, then the number of lenses must be slightly different from the number of lines, or multiples thereof, to result in a moire effect. If the lenses are positioned at slight angles to the lines, then the number of lenses may be the same as the number of lines or multiples thereof. The lines of color may be solid or broken.

Oct. 21, 1969 J. E. HAUFFAKER 819074 T867008 DEF. PUB.

ORNAMENTAL FABRIC HAVING A TRANSPARENT LENTICULATED COATING AND METHOD OF MAKING

Filed April 24, 1969

JAMES E. HUFFAKER
INVENTOR

BY John F. Stevens

ATTORNEY